Patented July 4, 1933

1,916,289

UNITED STATES PATENT OFFICE

WALTER R. THURSTON, OF LOS ANGELES, CALIFORNIA

COMPOUND

No Drawing. Application filed February 21, 1928. Serial No. 256,063.

My invention consists in a new and useful improvement in compounds, and is designed to produce a compound for use as a base for electrical insulation material, surface coverings, such as paints, etc., luting, and sealing pastes. The particularly novel and useful features of my improved compound are that it may be produced in either liquid or solid form by desired proportioning of the ingredients, that it may be produced in such a manner that it is affected by temperature changes, and also may be so produced as to be impervious to such changes, that it serves as a non-conductor of an electric current, and that it is substantially insolvent in all common solvents including water.

While I have hereinafter fully described the nature of my improved compound, it is to be distinctly understood that I do not consider my invention limited by said disclosure, but refer for its scope to the claims appended hereto.

By actual experience in both laboratory tests and practical tests of my compound, I have satisfactorily demonstrated the utility of my compound, as above set forth, and such experience has shown that the compound can be produced by the use of a large variety of ingredients, and in a large variety of forms suited to varied uses.

My compound consists essentially of a novel chemical compound derived by the combination of any one of that class of carbohydrates embraced by the chemical term "sugar", with a metallic oxide. I have discovered by means of numerous experiments that the compound derived from these two elements possesses chemical and physical properties which differ widely from those possessed by either of its constituent elements. The compound can be produced in solid form so that it can be cut or shaped to assume desired forms, or it can be ground to be used in powdered form as a base for paint or other surface coverings. It may also be moulded into desired form by pouring into moulds while in a fluid state and be allowed to harden. It can be produced in a plastic state to form the base for sealing compositions and for such uses it may be produced so as to be expansible under the influence of high temperatures, or so that it is not so affected.

Experience has shown that the sugar element of my improved compound can be supplied by using any of the ordinary forms of molasses derived from sugar cane, beets or maize, or by the use of maize syrup, cane syrup, or beet sugar, etc. I have found that the metallic oxide element can be supplied by the use of manganese resinate, litharge or other similar oxides. As one method of producing my improved compound, I have found the following to be satisfactory: Into twenty pounds of molasses I stir thoroughly about fifty grams of litharge until the component elements are combined, and allow the mixture to stand until the desired degree of plasticity or hardness has been attained.

As another method of producing my improved compound, I have found the following to be satisfactory: I first make a saturated solution of nitrobenzol and manganese resinate and then stir this saturated solution thoroughly into twenty pounds of molasses, continuing the mixing until the component elements are combined, and then allowing the mixture to stand until the desired degree of plasticity or hardness has been attained.

Having described my invention, what I claim is:

1. A composition composed of molasses with a saturated solution of manganese resinate and nitrobenzol.

2. A composition composed of sugar solution with a saturated solution of manganese resinate and nitrobenzol.

In testimony whereof I affix my signature.

WALTER R. THURSTON.